Aug. 2, 1927.

E. C. WEISGERBER

TOOL JOINT

Filed Nov. 15, 1926

1,637,628

INVENTOR.
EDWIN C. WEISGERBER.
BY
ATTORNEY

Patented Aug. 2, 1927.

1,637,628

UNITED STATES PATENT OFFICE.

EDWIN C. WEISGERBER, OF LONG BEACH, CALIFORNIA.

TOOL JOINT.

Application filed November 15, 1926. Serial No. 148,443.

This invention relates to coupling devices and is particularly applicable to tool joints for connecting lengths of drill pipe used in drilling oil or artesian wells with rotary well-boring apparatus. The objects of the invention are to provide a simple coupling device or tool joint in which accumulations or deposits of mud, detritus, oil, or other foreign substances that may lodge on or within the threaded areas of complementary coupling units, will not interfere with a perfect engagement of co-operating coupling surfaces; to provide a simple arrangement for connecting lengths of drill pipe, in which all foreign substances which have collected in the inter-engaging threaded surfaces of the tool joint and have been displaced by the progressive engagement of the threaded surfaces are removed, whereby the inter-engaging threaded surfaces may be screwed home with a metal to metal contact; and to provide a simple coupling device or tool joint in which the threads of the co-acting coupling members are accurately alined before engagement, thus minimizing the liability of damage to the threads, due to inaccurate alinement.

The invention consists of a plurality of coupling sections, each internally threaded to receive a length of drill pipe, and arranged for interfitting association. The coupling sections are provided with means for engagement with each other whereby, prior to the mutual engagement of their respective threaded surfaces, they are accurately alined. Between the co-operating coupling sections is provided a pocket or chamber for receiving whatever accumulations have been displaced by the mutual engagement of the interfitting threaded surfaces.

Figure 2:
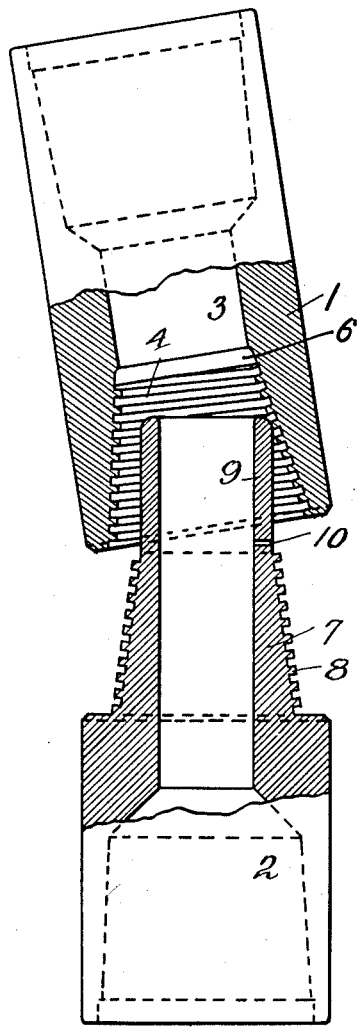
Figure 1:
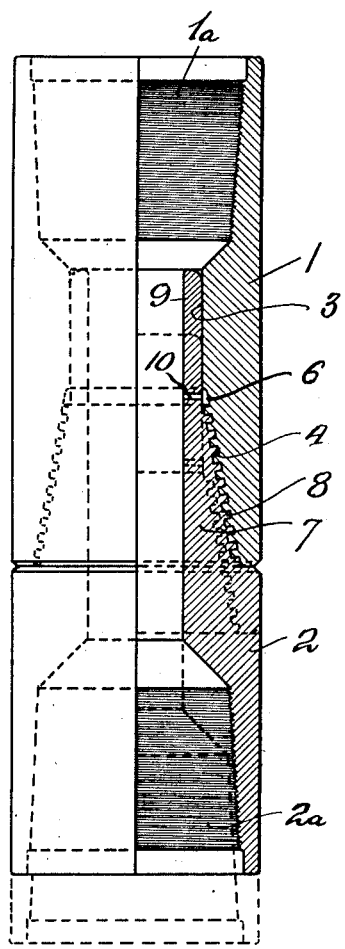

The invention is shown in a preferred form of embodiment in the accompanying drawings, in which Figure 1 is an elevation, partly in section and Figure 2 is a sectional view of the sections prior to the engagement of the threads thereof.

Referring to the form of embodiment of the invention illustrated, 1 and 2 indicate hollow sections of a coupling unit, each section being internally threaded as at 1ª and 2ª, respectively, to receive threaded portions (not shown) of drill pipe.

The section 1 is formed intermediate its ends with a smooth cylindrical portion 3, and with an inwardly internally threaded tapering bore 4. The wall of the cylindrical portion 3 of the section 1 immediately above the top thread of the threaded bore 4 is provided with an annular recess 6, which, in co-operation with the complementary section 2 of the coupling unit, as hereinafter explained, constitutes a pocket for the reception of mud and other foreign substances expressed from between the interacting threads during the progressive engagement thereof.

The section 2, which as stated, is arranged for threaded connection with a portion of a drill pipe is formed with a hollow conical extension 7, provided with external threads 8 for engagement with the threads 4 of the section 1. The section 2 is also formed with a hollow cylindrical extension 9, projecting beyond the terminus of the threads 8 on said conical extension 7, for a distance sufficient to enter the cylindrical portion 3 of the section 1 prior to the engagement of the threads 8 on the conical extension 7 with the threads 4 of the section 1. This extension 9 is rounded at the end thereof to permit same to ride over the threads in the section 1, as shown in Figure 2, without damage thereto, thereby eliminating the liability of stripping or otherwise damaging the threads of the coupling device as has been the constant disadvantage attending the couplings heretofore used. This extension 9 co-operates with the recess 6 in the cylindrical part 3 of the section 1, to form the said pocket 6 into which foreign matters displaced during the threading operation of the sections 1 and 2 are forced, permitting thereby a perfect seating. Foreign substances which are in excess of the capacity of the recess 6 are forced into the cylindrical bore of the hollow sections 1 and 2, through an opening 10 provided in the cylindrical extension 9, whereby such excess is disposed of by the water passing through the tool joint in the course of the drilling operations.

During the coupling together of the sections the extension 9 of the section 2 is slid into the cylindrical portion 3 of the section 1, whereby both sections are axially alined and the threads thereof are held out of contact, as shown in dotted lines in the figure, until actually alined for engagement by the continued introduction of the section 2 into the section 1. Thereupon, by rotation, the coupling of the sections 1 and 2 is effected.

What I claim is:

1. A coupling device for connecting lengths of drill pipe comprising two sections each having a longitudinal perforation and formed for attachment to a length of drill pipe, the sections respectively provided with interengaging threads, and one section having a recess for collecting foreign accumulations displaced during the interengagement of the threads of the respective sections and the other section having an opening communicating with said recess and the perforation of said other section.

2. A coupling device for connecting lengths of drill pipe comprising two sections, each longitudinally perforated and formed for attachment to a length of drill pipe, the sections respectively provided with interengaging threads and with mutually co-acting means to aline said sections axially, and one of said sections having a passageway communicating with the perforation therein for foreign matters displaced during the interengagement of the threads of the respective sections.

3. A coupling device for connecting lengths of drill pipe comprising two hollow sections each formed for attachment to a length of drill pipe, the sections being provided with interengaging threads and with interfitting means for axially alining the two sections, and one of said sections provided with a recess, and the other of said sections having an opening communicating with said recess and the bore through said sections.

4. A coupling device for sections of a well drilling stem comprising two hollow sections each formed for attachment to a section of a drill stem, one of said sections having an inwardly extending tapering threaded bore and formed with a cylindrical portion, said cylindrical portion provided with an annular recess immediately above the top thread of the threaded bore, and the other section formed with an externally threaded conical extension arranged for interfitting engagement with the threaded bore of said first named section, and with a cylindrical extension projecting beyond said conical extension, said cylindrical extension arranged to slide in the cylindrical portion of said first named section to aline said sections axially, and provided with an opening communicating with said recess and the bore through said sections.

In testimony whereof I have set my hand.

EDWIN C. WEISGERBER.